July 25, 1961  W. B. TARPLEY, JR., ET AL  2,993,469
AEROSOLIZATION AND COATING APPARATUS
Filed May 24, 1957  2 Sheets-Sheet 1

INVENTORS
WILLIAM B. TARPLEY Jr.
JAMES BYRON JONES
JOHN L. STRAUGHN
BY Arthur H. Seidel ATTORNEY.

Fig. 2.

United States Patent Office 2,993,469
Patented July 25, 1961

2,993,469
AEROSOLIZATION AND COATING APPARATUS
William B. Tarpley, Jr., James Byron Jones, and John L. Straughn, West Chester, Pa., assignors to Aeroprojects, Inc., West Chester, Pa., a corporation of Pennsylvania
Filed May 24, 1957, Ser. No. 661,432
9 Claims. (Cl. 118—303)

The present invention relates to an aerosolization apparatus; and more particularly to an aerosolization apparatus from which very fine aerosol particles are dispensed, with the relatively large particles being selectively separated, and recovered, and to an aerosolization process for producing aerosol particles of closely regulated size.

True aerosols have a particle size range of the order of 60 microns in diameter, or smaller; preferably below 10 microns, and represent an intermediate stage between the coarsely dispersed state and the atomic or molecular particle size incident to complete vaporization. Additional working features are provided by this subdivision of materials in the finest possible form without complete vaporization, since the aerosol has attributes of both non-vapor and vapor states. Decreased particle size prolongs the life, and therefore effectiveness, of these colloidal systems, their persistence being less endangered by the settling and agglomeration-settling tendencies of larger, heavier particles. In addition, other characteristics of aerosols, particularly liquid aerosols, are appropriate and useful for specific purposes: their tendency to move even in still air (Brownian movement), their possible ionization, their possession of distinct properties not readily apparent in the original state of the dispersed material.

This selective atomization is useful to science and industry for applications requiring increased surface area. It has been determined that the increased surface area created when dealing with liquids, for example, is inversely proportional to the diameter of the atomized drop; an increase of such magnitude that it is difficult to appreciate readily, but one which has great significance in the hastening of physical or chemical processes involving heat or mass transfer between liquid and gas phases, since these transfer coefficients also increase as drop size decreases.

In particular, particle size regulation within narrow limits has been found to furnish more even distribution of liquid upon materials to which the aerosolized liquid particles are applied. For example, in the treatment of fabrics by the exposure of such fabrics to a stream of aerosolized particles, the efficacy of the treatment is frequently dependent upon the uniformity of the particle sizes in the stream of aerosolized particles to which the fabric is exposed.

This invention has as an object the provision of an aerosol apparatus which may produce aerosol particles of relatively small diameter.

This invention has as a further object the provision of an aerosol apparatus for producing aerosol particles whose diameters fall within a relatively narrow size range.

This invention has as another object the provision of an aerosol apparatus which is capable of effecting close and precise classification of the aerosol particles immediately after they are produced.

This invention has as yet another object the provision of an aerosol apparatus in which the relatively large particles, if any, produced by the generator are separated and collected, permitting the materials from which such particles are made to be recycled.

This invention has as a still further object the provision of an aerosol apparatus in which facile dispersing or coating of aerosolized particles with or upon relatively large particles is accomplished.

Other objects will appear hereinafter.

For the purpose of illustrating the invention there is shown in the drawings forms which are presently preferred; it being understood, however, that this invention is not limited to the precise arrangements and instrumentalities shown.

FIGURE 1 is a longitudinal sectional view of the apparatus of the present invention.

FIGURE 2 is a sectional view through the nozzle means portion of the apparatus of the present invention.

FIGURE 3 is a fragmentary sectional view of another embodiment of the apparatus of the present invention.

Referring to the drawings, the apparatus of the present invention includes an upright shell designated generally by the numeral 10, which is preferably formed of three component parts, namely a generally cylindrical center portion 12, a hollow generally conical upper portion 14, and a hollow inverted generally conical lower portion 16.

The shell 10 is provided with a gas inlet designated generally by the numeral 18, which in the illustrated embodiment is axially positioned at the base of inverted conical lower portion 16. A blower, fan, or other gas impeller designated by the numeral 20 is in gas communication with gas inlet 18, with a filter 22 being provided in advance of the blower 20. In the illustrated embodiment, the blower 20 is arranged to force air from the atmosphere into shell 10; but it is, of course, to be understood that if desired, particularly where the unit is used on readily oxidizable materials, that blower 20 may be connected to a source of inert gases or other gas source for introducing such gases into the unit.

The blower 20 is provided with a standpipe 23 which extends axially upwardly within lower portion 16 in order to provide a sump for recycle outlet 24 as will be more fully explained below.

The recycle outlet for liquid recycle 24 comprises a pipe or other conduit fixedly secured to and penetrating the lower portion 16 of shell 10. Recycle outlet 24 is somewhat below the mouth 25 of standpipe 23 so that a sump is formed for collecting liquid at the bottom of lower portion 16.

The nozzle means for the apparatus of the present invention is designated by the numeral 26 and is preferably positioned generally on the longitudinal axis of cylindrical portion 12 intermediate the upper and lower ends of such portion. Nozzle means 26 produces an essentially horizontal disc-shaped aerosol plume in which the finer particles are slowed preferentially by drag forces while particles of greater mass are projected further toward the inner wall of shell 10. The spacing of the nozzle means 26 from the inner wall surface of the wall of the cylindrical portion 12 permits a classification of the particles emanating from nozzle means 26 to be made. Furthermore, the velocity of the air projected from blower 20 assists in the classification of the particles emanating from nozzle means 26.

The nozzle means 26 in the illustrated embodiment of the present invention comprises a nozzle for producing an aerosol from a liquid. By liquid is meant liquid compounds, molten solids, liquid mixtures, liquid emulsions, colloidal solutions, etc. The nozzle means 26 is supplied with gas by means of a gas conduit 28 and with liquid means of a liquid conduit 30.

In place of the nozzle means 26 shown herein, the nozzle described in copending Serial No. 632,332, filed on January 3, 1957, now Patent No. 2,929,563, for Process for Generating Aerosols and Apparatus Therefor in the name of James Byron Jones which utilizes a gas barrier may be substituted.

Figure 2:
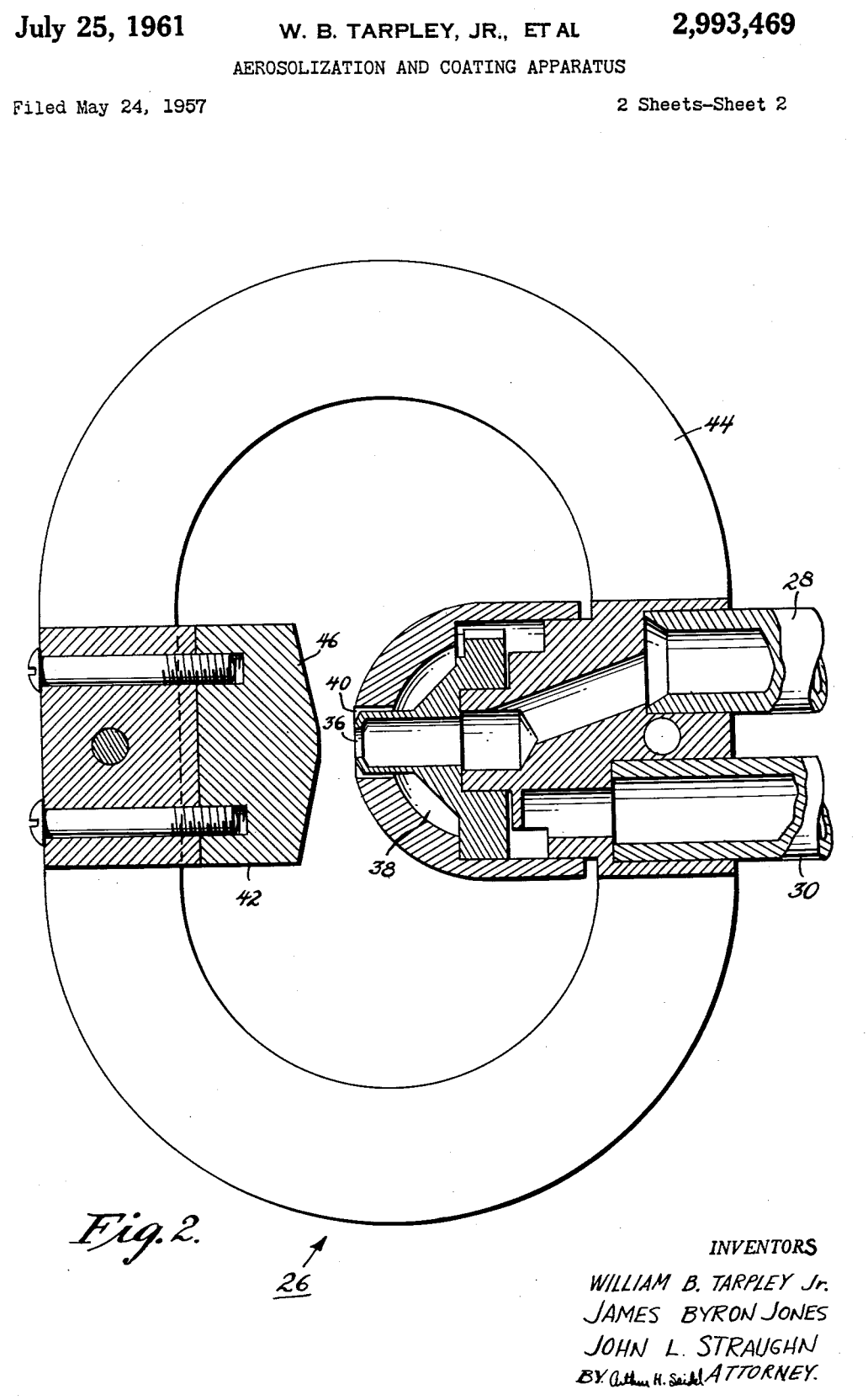

Referring now particularly to FIGURE 2, the gas conduit 28 is in gas communication with the central gas outlet 36 of nozzle means 26. The liquid conduit 30 is in communication with the enlarged chamber 38 which discharges liquid through outlet 40, the liquid outlet 40 being concentric with and embracing the gas outlet 36.

A barrier 42 is retained by means of yoke 44 at a spaced axial distance from the outlets 36 and 40, with the face 46 of barrier 42 juxtaposed to the outlets 36 and 40.

The discharge outlet for shell 10 comprises the pipe 48 which is positioned at the apex of upper portion 14. As heretofore noted, there is a definite relationship between the particle size, the radial distance from nozzle means 26 and the inner wall of cylinder 12, the nozzle gas velocity, and the gas velocity from impeller 20. Thus, classification of the larger particles from the smaller particles, including classification of particles within the aerosol size ranges may be effected by varying the distance between nozzle means 26 and the inner wall of shell 10 as well as by varying the nozzle gas velocity or impeller gas velocity.

The upper portion of pipe 48 comprises a T 50. A blower, fan or other gas impeller 52 having an associated filter 53 is positioned within arm 54 of the T 50, and heating means 55 is positioned in exit arm 56 of T 50. The aerosol particles produced by the apapratus are discharged therefrom through opening 58 in exit arm 56. The aerosol particles discharging from opening 58 may be played directly upon the materials which are to undergo treatment with such particles, or such particles may be directed into a chamber, reactor, classifier, or the atmosphere to achieve the particular goal which is sought to be achieved by the use of the apparatus.

The gas introduced into the unit through the blower 20 and/or the blower 52 will in most embodiments be the same gas that was introduced into the unit through gas conduit 28. However, in particular uses for the unit it may prove desirable to employ a different gas in connection with the blower 20 and/or the blower 52 than was introduced through gas conduit 28.

The embodiment shown in FIGURE 3 is identical to that of FIGURE 1 except that in place of T 50, there is substituted T 50a. T 50a generally resembles T 50 but includes a spray nozzle 60 which delivers large size liquid droplets into T 50a. The droplets from nozzle 60 are conveyed through T 50a from the gas stream introduced by impeller 52a and are engaged with the aerosol droplets rising through pipe 48a.

This arrangement facilitates coating of aerosolized particles from pipe 48a onto the liquid droplets in T 50a.

Collection of the coated droplets may then be accomplished by means of cyclone separator 62.

The embodiment shown in FIGURE 3 may be advantageously used to produce stable dispersions which will not cream or settle of wax-like food additives such as glycerine monostearate, which solidifies shortly after aerosolization from the molten state and may be coated onto larger particles of various food oils or water. The coated drops of oil or water are then collected in a cyclonic or other suitable collector to form dispersions which will not cream or settle at an appreciable rate since the wax particles are both finely divided and spherical.

In place of liquids, solid powders may be sprayed through nozzle 60 and coated with aerosolized liquid particles. Thus, carrier particles, as for example solid catalyst base particles may be impregnated with aerosolized solutions of catalytic materials, or pharmaceutical bases may be impregnated with aerosolized ingredients.

The apparatus of the present invention may be operated with either the gas or the liquid or both heated to an elevated temperature, or the unit may be operated with either the gas or the liquid or both maintained at ambient temperature conditions. The carrier gas from blower 20 may also be heated prior to its introduction into shell 10 in order to maintain the aerosol in a liquid state until further processing or use has been accomplished. The gas should be released from the gas outlet 36 at a superatmospheric pressure and at a speed greater than the speed of sound. Under these conditions the liquid will form a coaxial envelope, followed by distortion as the mixture approaches the barrier. Maximum distortion will occur upon the deflection of the gas stream resulting in the formation of the aerosolized liquid particles.

The gas and liquids which may be used in the present invention may be inert with respect to each other, with the gas serving only to effect aerosolization of the liquid. Alternatively, the gas and liquid may be chemically constituted so that the gas reacts with the liquid so that the resultant aerosol liquid droplets have a different chemical composition than the original liquid introduced through liquid conduit 30.

The number of uses to which aerosolized particles and/or coated particles produced by the present invention may be put is substantially infinite. Examples of uses to which aerosolized particles may be put, in which the regulation of the size of the particles is reflected in the efficacy of the process include the following: the coating of farm products with liquids, the coating of solders and tinning agents upon metals, the coating of metals with anticorrosive agents, the application of water-resistant coatings, the coating of a wide variety of materials with insecticides and/or fungicides, the finishing of a wide variety of fabrics with a wide variety of treating agents, the deposition of polishes and/or pigments upon a wide variety of materials, etc. In each instance the control of particle size uniformity and fineness will permit more uniform coatings, and therefore a more satisfactory product. Not only may the present invention be utilized for the coating of articles with aerosol particles, but it may be utilized for dissociation of mixtures into emulsions, and the homogenization of liquid-liquid and liquid-solid systems.

The present invention may be used for coating solid powders with non-reacting liquid particles of aerosol dimensions. For example, the present invention may be used to change the electrostatic properties of a wide variety of solids as by coating said solids with any one of a variety of proprietary materials such as the liquid sold by Armour & Company, Chicago, Illinois, designated "Arquad SS," a dialkyl diethyl ammonium chloride, or the liquids "Zelec DX," a complex organic cationic compound having a pH range of five to seven, and "Zelec NE," an anionic composition of alcohol phosphates, sold by the Organic Chemicals Department of E. I. du Pont de Nemours, Wilmington, Delaware. Thus, finely divided silica particles, such as are used as an additive in the manufacture of white-side-wall automobile tires, may have electrostatic characteristics advantageously affected by being coated with any one of the aforementioned materials. Silica particles coated in this manner are far more readily dispersible in rubber compound matrices, as reagglomeration of the silica particles is avoided.

In addition, finely divided solids may be coated with molten solids, as for example, the coating of unstable organic compounds (such as hygroscopic compounds) with a water-proofing wax. Other examples of the coating of solid particles in accordance with the present invention include the coating and subsequent wetting of crushed oil seeds with water or a variety of organic solvents; the coating of difficultly wettable solid powders, such as dry silver halide powders, namely finely divided silver bromide or silver chloride, or the coating of talc, or finely divided barium sulfate with liquids.

The present invention may be utilized for the coating of liquids with aerosolized liquid particles, such as with aerosolized particles of a molten solid. For example, liquid particles of vitamin oils may be coated with aerosolized particles of a molten wax to yield tiny beads of vitamin concentrate surrounded by wax.

The present invention may be used for the preparation of a wide variety of stable slurries and colloidal dispersions of solids and liquids, and of liquids and liquids; such as slurries of metal particles or inert solids such as silica, clays, or organic solids in water or other liquids; or dispersions of water and oils, liquid fats, etc.

A wide variety of examples revealing the aerosolization of liquids into aerosol particles, and the specific process variables utilized to effect the same are set forth in copending patent application Serial No. 661,360, filed on even date herewith entitled "Aerosolization Unit" in the names of James Byron Jones, John L. Straughn, and William B. Tarpley, Jr.

Examples of the process of the present invention involving the coating of relatively large particles (solid or liquid) with aerosolized particles include the following:

Example I

A hard wax mixture obtained from Atlas Powder Company, Wilmington, Delaware comprising a mixture of 83.3 weight percent of Atmul 84, a glycerine monostearate, 11.7 weight percent of Span 60, a sorbitan monostearate, and 5.0 weight percent of Tween 60, a polyoxyethylene sorbitan monostearate having a melting point of 150° F. is aerosolized at 225° F. to 235° F. with air. The air pressure at aerosolization is ninety to one hundred and ten pounds per square inch and the air temperature 340° F.

Finely divided milk powder is introduced through nozzle 60, which may comprise a standard insecticide duster, and engages the aerosolized particles of molten wax. The coated milk powder is rapidly withdrawn and collected by means of cyclone separator 62. Rapid cooling of the coated milk powder particles achieves hardening of the hard wax particles attached to and surrounded with milk powder particles.

Example II

The wax referred to in Example I is again aerosolized and is allowed to cool in the shell 10, but in place of solid milk particles, liquid particles comprising a vegetable cooking oil are sprayed from nozzle 60 and coated with the aerosolized wax. Upon collection of the wax-coated cooking oil drop, in the cyclonic or other collector 62, a stable dispersion of wax in cooking oil is obtained which settles very slowly.

Example III

A polyethylene wax of a molecular weight of 5,000 known as Epolene N, and having a viscosity of approximately 50-300 centipoises at 550° F. but with a decomposition region of about 400° F. and manufactured by the Tennessee Eastman Company, Kingsport, Tennessee, is aerosolized by metering the melted wax at a temperature substantially below 400° F. into a flash pre-heater just prior to atomization and by means of air heated to 550° F. which raises its temperature momentarily above the decomposition region to 550° F. substantially reducing the viscosity and permitting efficient aerosolization by means of the apparatus of copending patent application Serial No. 661,360, filed on even date herewith entitled "Aerosolization Unit" in the names of James Byron Jones, John L. Straughn, and William B. Tarpley, Jr., and utilizing the technique taught in copending patent application Serial No. 560,207, filed May 5, 1955 entitled "Aerosolization Process" in the names of James Byron Jones and John L. Straughn, now abandoned.

A moderately fine spray of cold water is introduced by means of nozzle 60 and coated with the aerosolized polyethylene wax. Subsequent collection of the wax-coated water drops in the collector 62 yields a stable dispersion of spherical particles of wax in water which can form the base for a variety of industrial products which upon incorporation of modifying additives are useful as mold release agents, floor waxes, etc.

Example IV

Tricresyl phosphate, a commercially used dust adhesive, is aerosolized at a temperature of 195° F. to 210° F. using air which has been heated to a temperature of 340° F. After the few large droplets greater than 60 microns are removed through impingement on the walls of shell 10, the aerosol comprising particles essentially less than 10 microns is conducted out of outlet 58 and drawn through a two-inch-thick mat of glass fibers such as comprise commercial dust filters. Examination of the resultant coating demonstrates that the uniformly dispersed aerosol particles are distributed far more uniformly throughout the thickness of the filter mat.

Example V

Stearic acid, a commonly used powder metallurgy lubricant, aerosolized at a liquid temperature of 200° F. with air at 300° F. The air pressure at aerosolization is ninety to one hundred and ten pounds per square inch.

Finely divided copper powder is introduced through nozzle 60, which may comprise a standard insecticide duster, and contacts the aerosolized particles of molten waxy stearic acid. Rapid cooling of the coated copper powder particles achieves hardening and attachment of finely divided particles of stearic acid, and following collection in the cyclone separator 62, a superior lubricated copper powder for use in molding powder metallurgy objects is obtained.

The present invention may be embodied in other specific forms without departing from the spirit or essential attributes thereof and, accordingly, reference should be made to the appended claims, rather than to the foregoing specification as indicating the scope of the invention.

We claim:

1. Aerosolization apparatus comprising in combination an upright shell nozzle means uprightly disposed within said shell for generating aerosol particles, said nozzle means including a liquid outlet concentrically disposed about a gas outlet, said outlets being directed upwardly, a liquid conduit in communication with said liquid outlet and a gas conduit in communication with said gas outlet, a barrier spaced above and facing said liquid and gas outlets, a liquid particle withdrawal conduit connected to the upper part of said shell, and an upwardly directed gas impeller in communication with said shell beneath said nozzle means.

2. Aerosolization apparatus comprising in combination an upright shell, nozzle means uprightly disposed within said shell for generating aerosol particles, said nozzle means including a liquid outlet concentrically disposed about a gas outlet, said outlets being directed upwardly, a barrier spaced above and facing said liquid and gas outlets, an upright liquid particle withdrawal conduit connected to the upper part of said shell, a T at the upper end of said liquid particle withdrawal conduit, a discharge conduit connected to one arm of said T and being angularly disposed to and in communication with said upright liquid particle withdrawal conduit, and a gas impeller in the other arm of said T.

3. Aerosolization apparatus comprising in combination an upright shell, nozzle means uprightly disposed within said shell for generating aerosol particles, said nozzle means including a liquid outlet concentrically disposed about a gas outlet, said outlets being directed upwardly, a barrier spaced above and facing said liquid and gas outlets, an upright liquid particle withdrawal conduit connected to the upper part of said shell, a discharge conduit angularly disposed to and in communication with said upright liquid particle withdrawal conduit, a gas impeller in said discharge conduit, and means for introducing particles into said discharge conduit intermediate said gas impeller and the point of communication between said discharge conduit and said upright liquid particle withdrawal conduit.

4. Aerosolization apparatus comprising in combination an upright shell, nozzle means uprightly disposed within said shell for generating aerosol particles, said nozzle means including a liquid outlet concentrically disposed about a gas outlet, said outlets being directed upwardly, a barrier spaced above and facing said liquid and gas outlets, an upright liquid particle withdrawal conduit connected to the upper part of said shell, a discharge conduit angularly disposed to and in communication with said upright liquid particle withdrawal conduit, and means for introducing particles into said discharge conduit whereby such particles are contacted with aerosolized particles from the upright liquid particle withdrawal conduit.

5. Aerosolization apparatus comprising in combination an upright shell, nozzle means uprightly disposed within said shell for generating aerosol particles, said nozzle means including a liquid outlet concentrically disposed about a gas outlet, said outlets being directed upwardly, a liquid conduit in communication with said liquid outlet and a gas conduit in communication with said gas outlet, a barrier spaced above and facing said liquid and gas outlets, an upwardly directed gas impeller in communication with said shell beneath said nozzle means, an upright liquid particle withdrawal conduit connected to the upper part of said shell, a discharge conduit angularly disposed to and in communication with said upright liquid particle withdrawal conduit, and a gas impeller in said discharge conduit.

6. Aerosolization apparatus comprising in combination an upright shell, nozzle means uprightly disposed within said shell for generating aerosol particles, said nozzle means including a liquid outlet concentrically disposed about a gas outlet, said outlets being directed upwardly, a barrier spaced above and facing said liquid and gas outlets, an upwardly directed gas impeller in said shell disposed beneath said nozzle means, an upright liquid particle withdrawal conduit connected to the upper part of said shell, a discharge conduit angularly disposed to and in communication with said upright liquid particle withdrawal conduit, and means for introducing particles into said discharge conduit whereby such particles are contacted with aerosolized particles from the upright liquid particle withdrawal conduit.

7. Aerosolization apparatus comprising in combination an upright shell, nozzle means uprightly disposed within said shell for generating aerosol particles, said nozzle means including a liquid outlet concentrically disposed about a gas outlet, said outlets being directed upwardly, a barrier spaced above and facing said liquid and gas outlets, an upright liquid particle withdrawal conduit connected to the upper part of said shell, a discharge conduit angularly disposed to and in communication with said upright liquid particle withdrawal conduit, a gas impeller in said discharge conduit, means for introducing particles into said discharge conduit intermediate said gas impeller and the point of communication between said discharge conduit and said upright liquid particle withdrawal conduit, and means in communication with said discharge conduit for collecting particles from said discharge conduit.

8. Aerosolization apparatus comprising in combination an upright shell, nozzle means uprightly disposed within said shell for generating aerosol particles, said nozzle means including a liquid outlet concentrically disposed about a gas outlet, said outlets being directed upwardly, a barrier spaced above and facing said liquid and gas outlets, an upright liquid particle withdrawal conduit connected to the upper part of said shell, a discharge conduit angularly disposed to and in communication with said upright liquid particle withdrawal conduit, means for introducing particles into said discharge conduit whereby such particles are contacted with aerosolized particles from the upright liquid particle withdrawal conduit, and means in comunication with such discharge conduit for collecting particles from said discharge conduit.

9. Aerosolization apparatus comprising in combination an upright shell, nozzle means uprightly disposed within said shell for generating aerosol particles, said nozzle means including a liquid outlet concentrically disposed about a gas outlet, said outlets being directed upwardly, a barrier spaced above and facing said liquid and gas outlets, an upwardly directed gas impeller in communication with said shell beneath said nozzle means, an upright liquid particle withdrawal conduit connected to the upper part of said shell, a discharge conduit angularly disposed to and in communication with said upright liquid particle withdrawal conduit, means for introducing particles into said discharge conduit whereby such particles are contacted with aerosolized particles from the upright liquid particle withdrawal conduit, and means in communication with said discharge conduit for collecting particles from said discharge conduit.

References Cited in the file of this patent

UNITED STATES PATENTS

| | | |
|---|---|---|
| 1,150,238 | Winbray | Aug. 17, 1915 |
| 1,847,009 | Kollbohm | Feb. 23, 1932 |
| 1,859,992 | Seil | May 24, 1932 |
| 2,071,846 | Lamb et al. | Feb. 23, 1937 |
| 2,097,914 | Cooper et al. | Nov. 2, 1937 |
| 2,561,394 | Marshall | July 24, 1951 |
| 2,768,095 | Tadema et al. | Oct. 23, 1956 |
| 2,785,838 | Mayer | Mar. 19, 1957 |
| 2,792,971 | Kaiser | May 21, 1957 |
| 2,826,454 | Coanda | Mar. 1, 1958 |
| 2,917,386 | Jones et al. | Dec. 15, 1959 |